(12) United States Patent
Fawley

(10) Patent No.: US 6,336,983 B1
(45) Date of Patent: Jan. 8, 2002

(54) METHOD OF AND APPARATUS FOR REINFORCING PIPE

(76) Inventor: Norman C. Fawley, 5701 Seaside Walk, Long Beach, CA (US) 90803

( * ) Notice: Subject to any disclaimer, the term of this patent is extended or adjusted under 35 U.S.C. 154(b) by 1002 days.

(21) Appl. No.: 08/781,605

(22) Filed: Jan. 9, 1997

Related U.S. Application Data

(63) Continuation of application No. 08/458,727, filed on Jun. 2, 1995, now abandoned, which is a continuation of application No. 08/100,196, filed on Aug. 2, 1993, now abandoned, which is a continuation of application No. 07/493,357, filed on Mar. 14, 1990, now abandoned.

(51) Int. Cl.⁷ ............................ B29C 63/06; F16L 55/18
(52) U.S. Cl. ........................ 156/94; 138/99; 156/187; 156/192
(58) Field of Search .......................... 156/86, 94, 98, 156/172, 175, 187, 192; 138/98, 99, 172, DIG. 6

(56) References Cited

U.S. PATENT DOCUMENTS

| 2,924,546 A | 2/1960 | Shaw ........................... 156/94 |
| 2,955,642 A | 10/1960 | Stark ........................... 156/94 |
| 3,358,898 A | 12/1967 | Medkeff ....................... 156/94 |
| 3,370,998 A | 2/1968 | Wiswell ....................... 156/94 |
| 3,531,345 A | 9/1970 | Torosian ...................... 156/94 |
| 4,511,626 A | 4/1985 | Schumacher ............. 428/425.6 |
| 4,559,974 A | 12/1985 | Fawley ........................ 138/172 |
| 4,676,276 A | 6/1987 | Fawley ........................ 138/172 |
| 4,700,752 A | 10/1987 | Fawley ........................ 138/172 |

FOREIGN PATENT DOCUMENTS

| JP | 109624 | 8/1979 | ................... 138/99 |
| SU | 1314179 | * 5/1987 | ................... 138/97 |

OTHER PUBLICATIONS

Reinforcement Digest, "A new family of composite products stops cracks in line pipe, extends life of pipelines, improves safety", pp. 2–5, Jan. 1989.
Grid, R & D Progress, pp. 42 and 43, Fall 1989.
Pipeline Reinforcement, Clock Spring, four pages, Nov. 10, 1987.
Pipeline Reinforcement, Clock Spring, Applications of Clock Spring (No date).

\* cited by examiner

Primary Examiner—Steven D. Maki
(74) Attorney, Agent, or Firm—Venable; John P. Shannon

(57) ABSTRACT

Reinforcing bands of high tensile strength filaments in a cured resin matrix are in the shape of a coil having a plurality of elastic convolutions for reinforcing a weakened pipe. Areas of depressions on the exterior surface of the pipe are filled with a load transfer filler material and the bands are coiled around the pipe with adhesive holding an innermost convolution of the coil to the pipe and subsequent convolutions of the coil to adjacent convolutions. A plurality of the bands are placed in abutment with one another to cover the entire weakened area of the pipe.

30 Claims, 3 Drawing Sheets

METHOD OF AND APPARATUS FOR REINFORCING PIPE

This is a Continuation of application Ser. No. 08/458,727 filed Jun. 2, 1995, now abandoned, which is a continuation of application Ser. No. 08/100,196 filed Aug. 2, 1993, now abandoned, which is a continuation of Ser. No. 07/493,357 filed Mar. 14, 1990, now abandoned.

BACKGROUND OF THE INVENTION

The present invention relates to reinforcing pipe and, more particularly, to a method and apparatus for reinforcing pipe in a pipeline which carries gas and/or liquid under pressure. The method and apparatus according to the present invention is especially useful in reinforcing a pipeline in service which has corroded or otherwise deteriorated over time.

Pipelines for carrying gas or liquid under pressure are ordinarily made of steel in order to with stand the fluid pressures necessary to transport fluids over large distances. Even though measures are taken during the manufacture or installation of the pipe in the pipeline to prevent corrosion, corrosion occurs. Pipelines buried in the ground are subject to deterioration from electrolytic and biochemical corrosion, cyclical soil stress, cathodic disbanding, and mechanical damage from machinery used to install the pipeline or to expose, inspect and repair the pipeline after installation. In addition, attachments to the pipe, such as valves, made of metal dissimilar to the metal of the pipe can result in galvanic corrosion, as can damp soil. Over time, the pipes exhibit pits and dents.

Currently, the most common way of reinforcing a deteriorated pipeline is to detect areas of corrosion by means of a "smart pig" or cathodic surveys, dig up the deteriorated regions of the pipeline, remove any corrosion protection material which may have been placed around the pipe, clean the surface by shot-blasting, and apply a primer. The pressure of fluid flow through the pipe is reduced, and split steel sleeves are welded or bolted onto the pipe. A plurality of the sleeves are installed end to end until the entire deteriorated area of the pipeline is covered. The pressure of the fluid is boosted to normal and the pipeline buried.

Drawbacks of this process are that the steel sleeves are very heavy and, therefore, require cranes and several men to move them to the pipeline and into the proper position. The welding process is time consuming and requires skilled workers. The sleeves are welded longitudinally and circumferentially. The presence of longitudinal welds prevents the sleeves from providing a gas-tight or liquid-tight seal. The circumferential welds between the sleeves and having a high carbon content create a heat effected zone in the pipe which is structurally weakened.

The sleeves are intended to take up loading from the corroded portions of the pipe. In order to transfer the load from the pipe to the sleeve, there must be a tight fit of the sleeve around the pipe. This is difficult to achieve with sleeves because the pipes tend to become distorted and, when they do, the sleeves do not fit properly and must be polished, that is, they must be ground to properly fit the pipe so as to adequately take up the load. Furthermore, there is a considerable amount of pipeline in and around oil refineries and tank farms where welding cannot be done.

The present invention is directed to a method for restoring the burst strength of a pipe having an unbreached weakened region to at least the level for which the pipe was designed. For example, by the method of the present invention, the burst strength of a pipe having an unbreached weakened region can be restored to a level at which the pipe can withstand the forces of a pressure fluid in the pipe having a pressure of at least 500 pounds per square inch.

SUMMARY OF THE INVENTION

Through the use of the method and apparatus according to the present invention, a pipeline can be reinforced without removing the pipeline from service, without using cranes or other heavy equipment for moving the reinforcement into position, and without employing welding or other time consuming procedures. the pipeline can also be reinforced without the application of heat which would cause weaknesses in the pipe and present a hazard to safety and without the need for skilled labor.

The present invention achieves these advantages through the use of bands of elongate unidirectional, lightweight, non-metallic, high tensile strength filaments in a resin matrix cured to form a strip in the shape of a coil similar to a clock spring, wherein the coil has an elastic memory. Although the coil has a continuously changing radius of curvature, the coil bands for a pipe of predetermined outer radius are chosen so that the radii of all portions of the coil band are smaller in the relaxed state of the band than the outer radius of the pipe, so that, when the bands are wound around the pipe, the elastic memory or set in the convolutions of the bands helps maintain the bands in contact against the pipe, for the first convolutions, and in contact with the underlying convolutions for the later convolutions. Because the resin matrix for the filaments is already cured at the time of installation, there are no fumes associated with the matrix during the installation of the bands. The problem is especially acute since work usually must be performed in a ditch where any fumes would accumulate. Furthermore, work often must be performed in adverse climatic conditions in which uncured resins will not work properly.

In order to reinforce an existing pipeline, the earth is dug out around and under the pipeline, as is conventionally done, and the surface of the pipe in the pipeline is prepared in a conventional manner.

The coil bands are carried manually to the pipe and manually supported and wound around the pipe, most efficiently by a two-person team. For each band, the outer end of the coil is secured to the pipe by an adhesive pad, and the band is unwound from the coil and onto the pipe as the coil is moved around the pipe. The pipe is coated with a layer of adhesive, for example, with a paint roller or brush or by spraying, and the coil is moved around the pipe. A coating of the adhesive is applied to the outer surface of each convolution of the band as the band is wound around the pipe so that a continuous layer of adhesive is defined between adjacent convolutions of the band. When the band is completely unwound from its coil and onto the pipe, it forms a new coil, inverted with respect to the original coil. The next band is brought into position and installed in the same manner, so that its edges abut the edges of the first reinforcing band. The bands are in intimate contact with the pipe, either directly or through the load transferring filler material, by which the load on the pipe is transmitted to the bands. As a result, the bands reinforce the pipe, preventing the pipe from bulging due to stresses too great for the weakened metal alone and thereby preventing failure of the pipe. Coil bands having a plurality of, typically about five, convolutions provide the deteriorated pipe with greater burst strength than it had when it was new, allowing the pipe to withstand up to twice the bursting pressure where the wall of the pipe is completely reinforced with the bands.

DETAILED DESCRIPTION OF THE PREFERRED EMBODIMENTS

Figure 1:
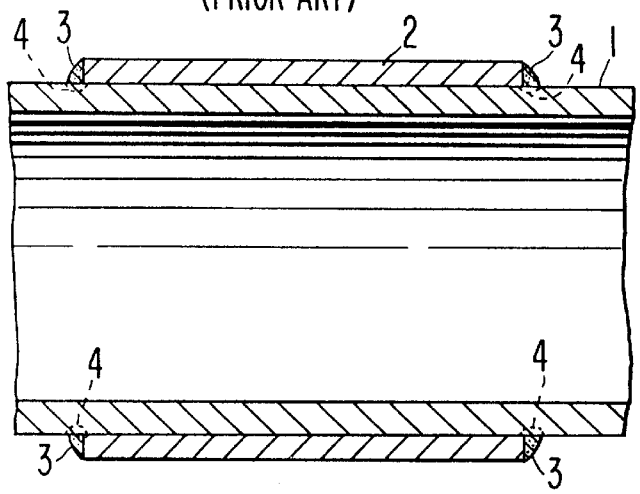
FIG. 1 is a cross section of a pipe having a steel sleeve welded around it to provide reinforcement in a known manner.

A common way of reinforcing a pipe in the field is to detect areas of deterioration, dig up the deteriorated areas, remove any corrosion protection material, clean the surface, and apply a primer. The flow of fluid through the pipeline is reduced and, as can be seen from FIG. 1, sections of a split steel sleeve 2 having an internal diameter just slightly larger than the outer diameter of the pipe 1 are placed around the pipe until they cover the deteriorated region which is to be reinforced. The sleeve 2 is welded to the pipe 1 circumferentially at the ends of the sleeve, the welding beads being designated by the reference numeral 3. Additional, longitudinal welding beads (not shown) secure the sections of the split sleeve to one another. The heat of welding of the beads 3 results in regions 4 of embrittlement in the pipe causing a structural weakening of the pipe.

The first step in reinforcing a pipeline in accordance with the present invention is the detection of corrosion or other weakness. This is done conventionally by cathodic surveys or by sending a smart pig through the pipe which is capable of detecting the presence and location of the weakness. After the areas of corrosion have been determined, the portions of the pipeline containing the weakened areas are exposed by excavating along the sides of and underneath the pipeline.

Figure 2:
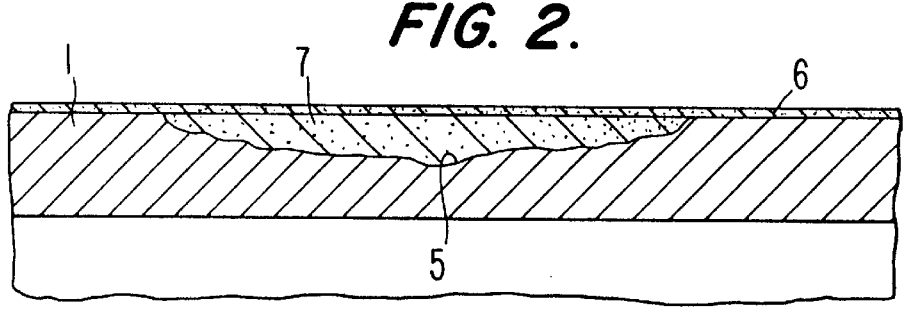
FIG. 2 is an enlarged fragment of a cross section of a pipe showing a repaired region of deterioration.

Pipelines ordinarily have corrosion protection, typically in the form of coal tar or tape or thin film epoxy. The corrosion protection has a tendency to become damaged, and, when it does, corrosion occurs. Before reinforcing can be done, coal tar must be removed by "chipping" most of the coal tar and scraping off any of the coal tar which does not come off by chipping. The removal of the coal tar or other corrosion protection reveals the regions of corrosion, such as the region 5 of pits shown in FIG. 2, which leave the surface of the pipe 1 in a rough, irregular condition. Mechanical damage such as dents may also be present.

In the method of reinforcing the pipe according to the present invention, the pipe 1 is sandblasted to prepare the surface for a new corrosion protection layer 6. One suitable corrosion protection material is a two-part epoxy available from Celicote, Inc. under the name Flakeline 252. This material calls for the underlying surface to be white metal with an anchor pattern, a known surface standard which allows protective coatings to adhere properly. A pretreat bond primer is applied to the dents and areas of pitting caused by the corrosion, and a filler material 7 is applied on top of the primer to fill in the pits and provide the pipe 1 with a smooth outer surface having a constant diameter. A suitable filler material is a two-component epoxy available under the trade name Koppers Splash Zone Compound #A-788. The filler material 7 serves to transfer the load, that is, the forces applied to the pipe 1 by the pressure fluid inside the pipe, to the reinforcement yet to be installed. When the filler material 7 has cured, a layer of corrosion protection material 6 is applied to the filled-in regions of the pipe 1, as well as to adjacent regions which did not require filling in. The corrosion protection material 6 can be a conventional shrink sleeve, tape or mastic.

An adhesive 9 (FIG. 7) is applied by a conventional paint roller to the entire surface of the pipe 1, on top of the corrosion protection material 6. A suitable adhesive is a one component, moisture-activated urethane adhesive. An active ingredient in the adhesive causes a frothing and $CO_2$ outgassing between the coil reinforcement band 10 and the underlying surface, which is the corrosion protection layer 6. Mobay Baytec B-90 is a suitable adhesive.

Figure 3:
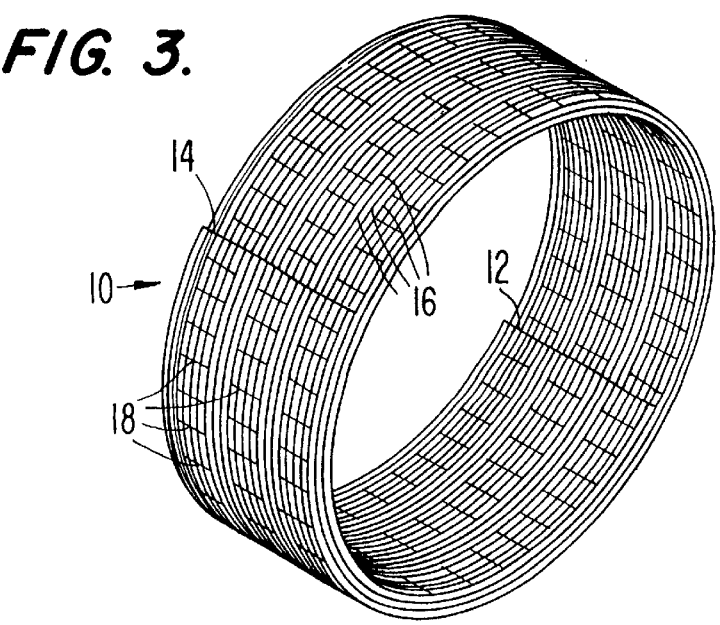
FIG. 3 is a perspective view of a coil reinforcement band according to the present invention.

As can be seen from FIG. 3, the coil reinforcement band 10 comprises a coil web of composite material having a rectangular cross section, an inner surface, an outer surface, and side or edge surfaces. The band 10 has a plurality of concentric elastic: convolutions including an innermost convolution having an inner end 12, an outermost convolution having an outer end 14, and intermediate convolutions. The composite material includes a large plurality of lightweight, high tensile strength, electrically non-conductive nonmetallic fibers extending parallel to one another along the length of the web, the fibers being encapsulated in a cured resin matrix. Although the parallel fibers are generally indicated in FIG. 3 by parallel longitudinal lines 16, each space between adjacent parallel lines 16 actually represents hundreds or thousands of longitudinal fibers, each having a diameter, in the case of E-type glass fibers, of less than 0.001 inch.

The longitudinal fibers may be held together by cross threads 18, which can facilitate the application of the resin matrix to the fibers during manufacturing prior to curing. With the cured resin in place, the composite material is impervious to soil corrosion and most fluid and, thereby, protects the fibers and the portion of the pipe 1 underlying the coil reinforcement band 10 from corrosion. Glass is a suitable material for the fibers and especially E-type glass fibers, because they are relatively inexpensive. Other fibers, such as fibers made of Kevlar, may also be used. Suitable resins are elastic when cured, thereby exhibiting an elastic memory, and, when they are cured in a coiled coil configuration as in the coil reinforcement band 10, the resins will cause the band 10 to return to the same coil configuration after being uncoiled, once the uncoiling force is removed. Like the fibers, the resins are electrically non-conductive, thereby enabling the coil reinforcement bands 10 to preserve the cathodic corrosion protection of the pipe. Polyester, polyurethane or epoxy resins can be used.

Figure 4:
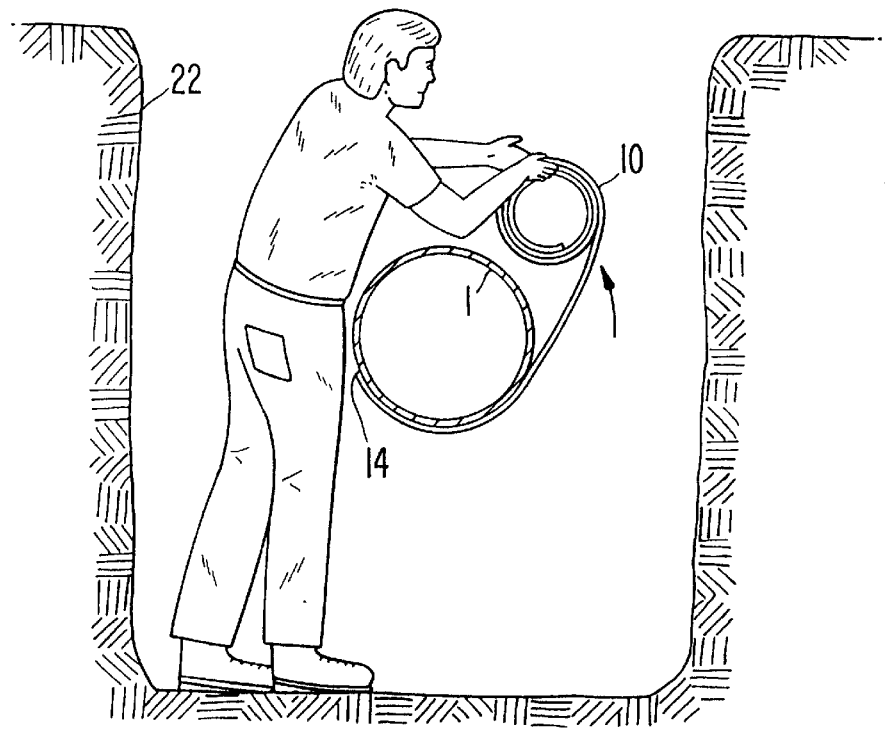
FIG. 4 is a view of a coil reinforcement band being installed around a pipeline in a ditch.

As can be seen from FIG. 4, after the pipe 1 has been properly prepared, an adhesive pad 8, having a contact adhesive on both sides, is attached to the pipe 1, on top of the corrosion protection material 6. A rectangularly shaped closed cell vinyl pad of 3½ inches by 9¼ inches has been found to work well. In FIG. 4, the reinforcement band 10 is being applied to a pipe 1 which is a part of a pipeline. The portions of the pipeline which require reinforcement are exposed by digging a ditch 22. No cranes or other equipment are required to move the reinforcement bands 10 to the pipeline or support the bands during installation on the pipe. Due to their light weight, the bands 10 can be carried and positioned manually, usually by one person. The weight of a coil reinforcement band 10 for a 16 inch diameter pipe, for example, is 14 pounds, and for a 30 inch diameter pipe, the weight is 29 pounds.

Figure 5:
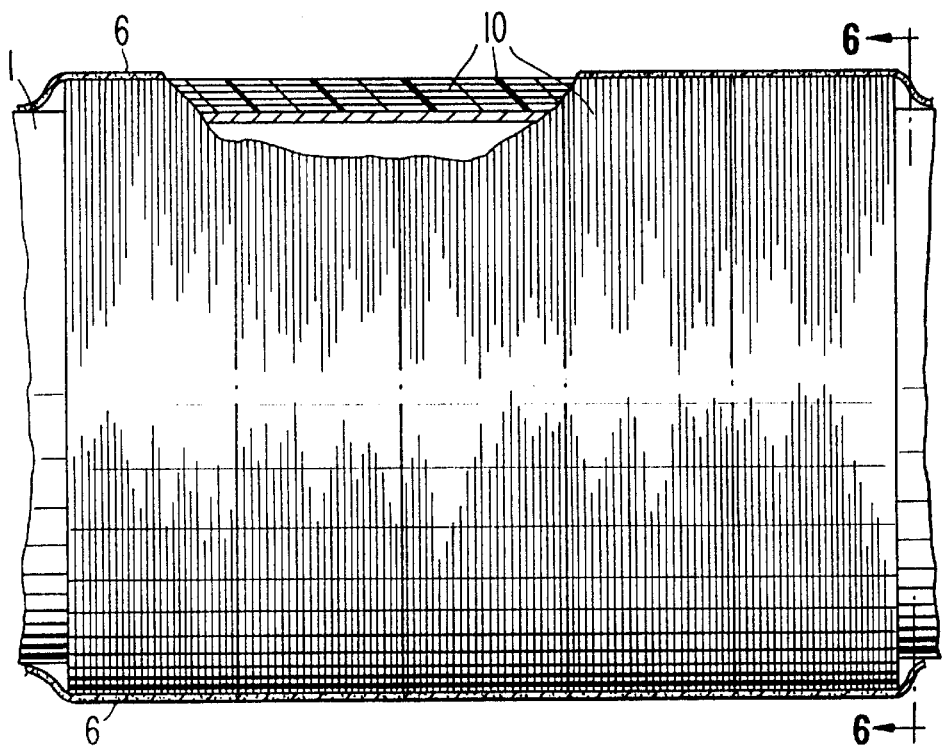
FIG. 5 is a fragmentary front view of a pipe on which a plurality of coil reinforcement bands according to the present invention have been placed to provide reinforcement, portions of some of the bands being cut away.
Figure 6:
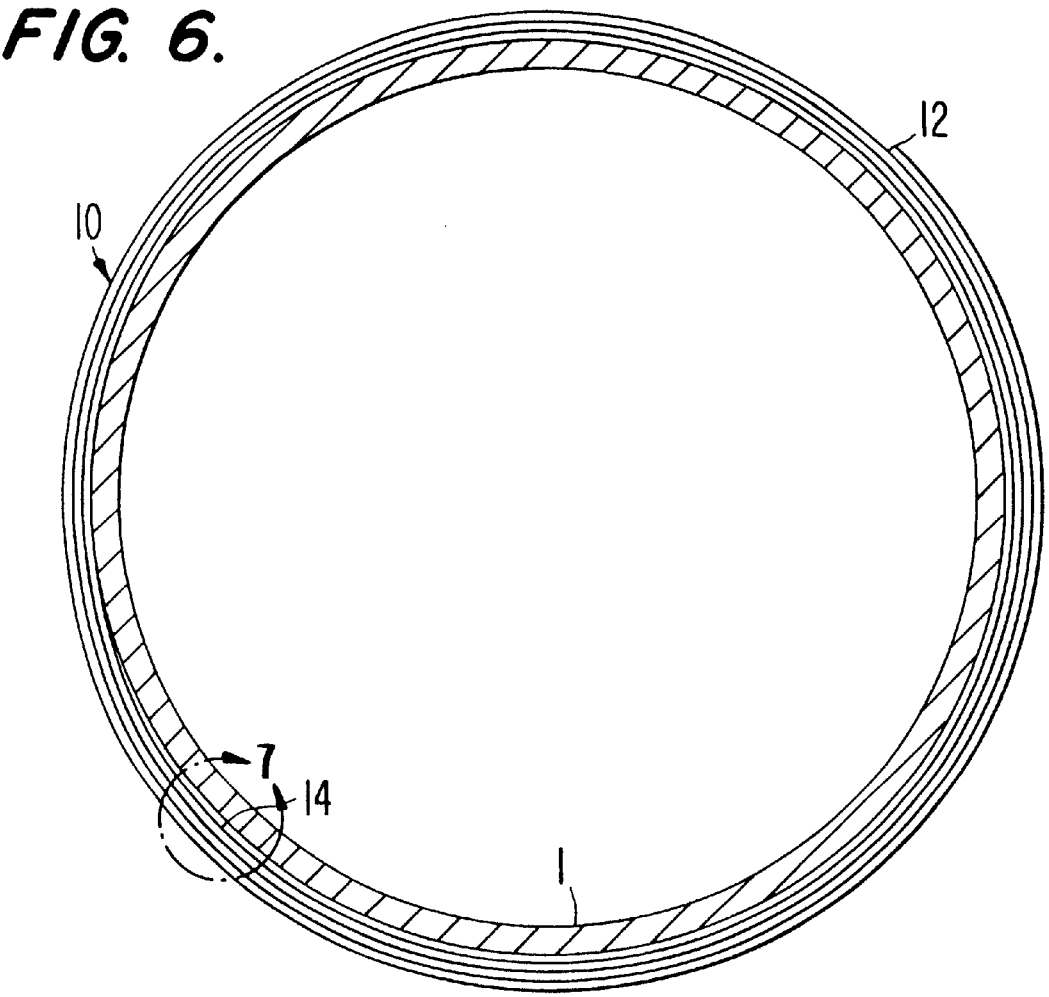
FIG. 6 is a transverse cross section of the pipe of FIG. 5 taken along the line 6—6.

The inner end 14 of the coil reinforcement band 10 is applied to the pipe 1 at the reference point by the adhesive pad 8. After the first end is attached to the pipe 1, the band 10 is uncoiled from its coil by moving the band over and under the pipe 1, and uncoiling the coil as it is moved around the pipe. This process is continued until the trailing end of the band 10 is brought into contact with underlying convolutions of the band and secured by, for example, fiber tape. Care should be taken with the first band 10 to assure that its edges are transverse to the longitudinal axis of the pipe 1 so that the first band 10 can serve as an alignment band for adjacent coil reinforcement bands 10 to be installed next, as can be appreciated from FIG. 5. In the embodiment of the invention illustrated in FIG. 5, the corrosion protection material 6, in the form of a shrink wrap (shown in cross section), can be placed over the bands 10, encapsulating the bands and the pipe, as an alternative to the corrosion protection being placed between the bands 10 and the pipe 1.

Figure 7:
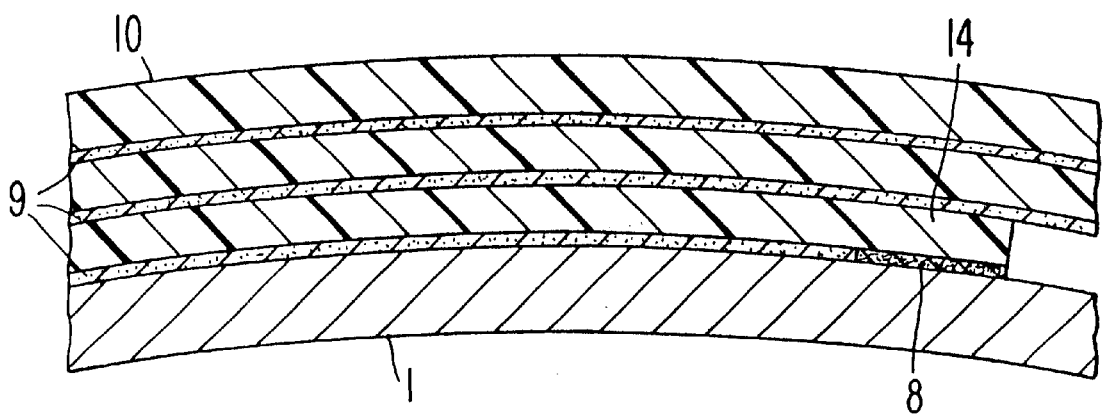
FIG. 7 is an enlarged fragment of the cross section of FIG. 6.

As can be seen from FIG. 7, after the first convolution is applied to the pipe 1, the outer surface of the convolution is coated with the adhesive 9 for the reception of the next convolution, and then that convolution is coated with the adhesive, and so on, until the final convolution is reached. The final convolution need not be coated. The adhesive coating 9 of each convolution is sprayed with water, or a catalyst activated with water, for activation of the adhesive before the next convolution is brought into contact with the adhesive. One or more bands of tape, for example, fiber tape, are placed around the reinforcement band 10 to hold the band 10 tightly in place until the adhesive 9 cures.

Although FIG. 4 shows a single person in the ditch 22, a two-person team is advantageous for applying the coil reinforcement bands, since each person can pass the coil over or under the pipe to the other person as the band is applied. In addition, each person can hold the remaining coil and maintain tension in the convolution being applied to the pipe to assure a tight fit, while the other person applies the adhesive coating to the external surface of the convolution. Upon water activation and curing, the adhesive permeates any gaps in the coil bands around the pipe and forces trapped oxygen to the surface, bonding the band permanently to the pipe, and the convolutions of the band to one another. The oxygen is converted to carbon dioxide through the reaction of the water and, thereby, eliminated. Without oxygen, the corrosion will not take place.

In order to evaluate the effectiveness of the coil reinforcement bands 10 as a pipeline reinforcement on a large diameter gas transmission pipe, two 20 foot 5LX56 DSAW pipes approximately 25 years old and taken out of natural gas service some years previously were tested. The pipes each had a 30 inch diameter and a 0.375 inch wall thickness. Each pipe had spot corrosion. The first pipe, which was tested without any reinforcement, had three major corrosion areas having pit depth ranges as follows:

| | |
|---|---|
| Group 1: | .055"–.100" |
| Group 2: | .045"–.090" |
| Group 3: | .085"–.120" |

The second section had ten areas of corrosion, the corrosion being substantially more severe than that of the first pipe. The pit depth ranges were as follows:

| | |
|---|---|
| Group 1: | .075"–.100" |
| Group 2: | .060"–.100" |
| Group 3: | .060"–.100" |
| Group 4: | .110"–.230" |
| Group 5: | .100"–.170" |
| Group 6: | .085"–.140" |
| Group 7: | .140" |
| Group 8: | .080"–.160" |
| Group 9: | .105"–.112" |
| Group 10: | .090"–.120" |

Twenty-one coil reinforcement bands 10 were applied to the second pipe, the bands 10 being in abutment with one another, covering all of the corroded areas, and covering substantially the entire length of the pipe. Prior to the application of the coil reinforcement bands 10, the entire second pipe was wire brushed, and the corroded areas were wire brushed a second time to eliminate all loose rust particles. The filler material 7 was applied in the pitted areas to provide force or load transfer from the wall of the pipe to the reinforcement bands 10. The urethane adhesive was applied and activated with water.

Headcaps were welded onto the ends of both pipes so that the pipes could be pressurized. The first pipe, the bare pipe, was placed in a test pit and filled with water. The water pressure was gradually increased with a 4 gallon per minute, three piston, 4,000 p.s.i., 10 horsepower hydrostatic pump. At 2,172 p.s.i., the pipe ruptured in the sidewall near the deepest pit grouping of that pipe, Group 3, which was 0.085"–0.120" in depth.

The second pipe, the pipe reinforced with the coil reinforcement bands 10, was placed in the test pit and similarly pressurized with water. At a pressure of 2,463 p.s.i., the pipe failed, not in the reinforced region, but at the juncture where one of the headcaps was welded to the end of the pipe. It is believed that the reason for the premature failure was due to an accelerated cooling rate of the steel under the conditions of welding, producing a heat affected zone which led to the failure.

A new welding procedure was developed which required the removal of one reinforcement band at each end of the pipe. After the headcaps were welded to the ends of the pipe by the new procedure, the pipe was again placed in the pit and pressurized with water. This time, the pipe did not fail until the water reached a pressure of 3,635 p.s.i., at which point the pipe failed adjacent to its long seam weld.

Similar tests were conducted on 16 inch, 24 inch and 36 inch pipes, with similar results.

A latitude of modification, change and substitution is intended in the foregoing disclosure. Accordingly, it is intended that the appended claims be construed broadly and in a manner consistent with the spirit and scope of the invention therein.

What is claimed is:

1. A method for restoring the burst strength of a pipe having an unbreached weakened region to a level at which the pipe can withstand the forces of a pressure fluid in the pipe having a pressure of at least 500 pounds per square inch, the weakened region comprising at least one depression in the outer surface of the pipe comprising:

detecting the weakened region;

providing a load-transferring filler material;

filling the depression with the filler material; and wrapping around the pipe in the weakened region a strip of high tensile strength material comprising unidirectional high tensile strength filaments in a cured resin matrix and defining a coil band having a length, an inner surface, an outer surface, opposite side surfaces and a plurality of elastic convolutions, the filaments extending parallel to the length of the coil band, the step of wrapping including placing a first elastic convolution around the pipe and placing subsequent elastic convolutions around underlying convolutions on the pipe such that the opposite side surfaces of the band in said subsequent elastic convolutions are in radial alignment with opposite side surfaces of the band in the underlying convolutions, the step of wrapping further including securing the convolutions from movement so that the convolutions do not move relative to one another when the pipe is pressurized, whereby the wrapped pipe has a burst strength of a level at which the pipe can withstand the forces of a pressure fluid in the pipe having a pressure of at least 500 pounds per square inch.

2. The method according to claim 1, wherein the high tensile strength filaments are nonmetallic.

3. The method according to claim 2, wherein the nonmetallic filaments comprise glass fibers.

4. The method according to claim 3, wherein the glass fibers comprise E-type glass fibers.

5. The method according to claim 1, wherein the step of wrapping comprises wrapping a plurality of said strips around the pipe such that the strips cover the weakened region.

6. The method of claim 1, wherein the step of wrapping further includes securing the first elastic convolution to the pipe with an adhesive.

7. The method of claim 1, wherein the convolutions are secured from movement relative to one another by an adhesive.

8. The method of claim 7, wherein the convolutions are secured from movement relative to one another by a coating of adhesive defining a continuous layer between adjacent convolutions of the band.

9. The method of claim 7, wherein the adhesive is a urethane adhesive.

10. The method of claim 9, wherein the urethane adhesive is moisture activated.

11. The method of claim 7, wherein the convolutions are secured from movement relative to one another by applying adhesive to an outer surface of each of the convolutions of the band except the outermost convolution.

12. The method of claim 1, wherein the method restores the burst strength of the pipe to a level at which the pipe can withstand the forces of a pressure fluid in the pipe having a pressure of at least 1000 pounds per square inch.

13. The method according to claim 1, wherein the step of wrapping further includes applying tension tangentially to the convolutions to place the coil band tightly in engagement with the filler material.

14. The method according to claim 1, further comprising applying an adhesive between the filler material and the coil band.

15. A method for restoring the burst strength of a pipe in a pressure fluid transmission pipeline, the pipe having an unbreached weakened region, to et least the level for which the pipe was designed, the weakened region comprising at least one depression in the outer surface of the pipe, comprising:

detecting the weakened region of the pipe in the pressure fluid transmission pipeline;

providing a load-transferring filler material;

filling the depression with the filler material; and wrapping around the pipe in the weakened region a strip of high tensile strength material comprising unidirectional high tensile strength filaments in a cured resin matrix and defining a coil band having a length, an inner surface, an outer surface, opposite side surfaces and a plurality of elastic convolutions, the filaments extending parallel to the length of the coil band, the step of wrapping including placing a first elastic convolution around the pipe and placing subsequent elastic convolutions around underlying convolutions on the pipe such that the opposite side surfaces of the band in said subsequent elastic convolutions are in radial alignment with opposite side surfaces of the band in the underlying convolutions, the step of wrapping further including securing the convolutions from movement so that the convolutions do not move relative to one another when the pipe is pressurized.

16. The method of claim 15, wherein the step of wrapping further includes securing the first elastic convolution to the pipe with an adhesive.

17. The method according to claim 15, wherein the step of wrapping further includes applying tension tangentially to the convolutions to place the coil band tightly in engagement with the filler material.

18. The method according to claim 15, further comprising applying an adhesive between the filler material and the coil band.

19. The method according to claim 18, wherein the adhesive is a moisture-activated urethane adhesive.

20. The method according to claim 15, wherein the high tensile strength filaments are nonmetallic.

21. The method according to claim 20, wherein the nonmetallic filaments comprise glass fibers.

22. The method according to claim 21, wherein the glass fibers comprise E-type glass fibers.

23. The method according to claim 15, further comprising wrapping a plurality of said coil strips around the pipe such that the coil bands cover the weakened region.

24. The method according to claim 23, comprising positioning the strips with side surfaces of the bands defined by the strips in abutment with one another.

25. The method of claim 15, wherein the convolutions are secured from movement relative to one another by an adhesive.

26. The method of claim 25, wherein the adhesive is a urethane adhesive.

27. The method of claim 26, wherein the urethane adhesive is moisture activated.

28. The method of claim 25, wherein the convolutions are secured from movement relative to one another by applying adhesive to an outer surface of each of the convolutions of the band except the outermost convolution.

29. The method of claim 25, wherein the convolutions are secured from movement relative to one another by a coating of adhesive defining a continuous layer between adjacent convolutions of the band.

30. The method according to claim 11, wherein the high tensile strength filaments are electrically non-conductive.

\* \* \* \* \*